United States Patent
Irvine

(10) Patent No.: US 10,850,428 B2
(45) Date of Patent: Dec. 1, 2020

(54) WET CUTTING SAW

(71) Applicant: Robert Andrew Irvine, Parrearra (AU)

(72) Inventor: Robert Andrew Irvine, Parrearra (AU)

( * ) Notice: Subject to any disclaimer, the term of this patent is extended or adjusted under 35 U.S.C. 154(b) by 203 days.

(21) Appl. No.: 15/509,991

(22) PCT Filed: Sep. 8, 2015

(86) PCT No.: PCT/AU2015/000550
§ 371 (c)(1),
(2) Date: Mar. 9, 2017

(87) PCT Pub. No.: WO2016/037216
PCT Pub. Date: Mar. 17, 2016

(65) Prior Publication Data
US 2017/0297224 A1    Oct. 19, 2017

(30) Foreign Application Priority Data

Sep. 10, 2014   (AU) .................................. 2014903619
Jul. 1, 2015      (AU) .................................. 2015902583

(51) Int. Cl.
*B28D 1/04*    (2006.01)
*B28D 7/02*    (2006.01)
(Continued)

(52) U.S. Cl.
CPC ........... *B28D 1/042* (2013.01); *B23D 45/028* (2013.01); *B23D 45/042* (2013.01);
(Continued)

(58) Field of Classification Search
CPC .......... B28D 1/042; B28D 1/045; B28D 7/02; B23D 45/028; B23D 45/042;
(Continued)

(56) References Cited

U.S. PATENT DOCUMENTS 2,673,725 A      3/1954  Coates
2,858,650 A  *  11/1958  Janowitz ............... B28D 1/045
                                                                173/24
(Continued)

FOREIGN PATENT DOCUMENTS

JP       H08-113914 A       5/1996
JP       2002-115208 A      4/2002
WO       WO-2009/143567 A1  12/2009

OTHER PUBLICATIONS

Notification of Transmittal of International preliminary Report on Patentability and International Preliminary Report on Patentability in PCT/AU2015/000550 (Chapter II of the Patent Cooperation Treaty) dated Dec. 20, 2016, 21 pages.
(Continued)

*Primary Examiner* — Joseph J Hail
*Assistant Examiner* — J Stephen Taylor
(74) *Attorney, Agent, or Firm* — Reichel Stohry Dean LLP; Natalie J. Dean

(57) ABSTRACT

A wet cutting saw for cutting a ground portion, the wet cutting saw including a blade rotatable about an axis, a liquid feed conduit for feeding liquid onto a surface of the blade as it rotates, a frame for carrying the blade and configured to travel over a surface of the ground portion, and a mounting assembly that mounts the blade to the frame, at least part of the mounting assembly pivotable relative to the frame to raise and lower the blade relative to the frame.

17 Claims, 5 Drawing Sheets

(51) Int. Cl.
  *B23D 45/04*   (2006.01)
  *B27B 5/10*    (2006.01)
  *E01C 23/09*   (2006.01)
  *B23D 45/02*   (2006.01)
  *B23D 47/08*   (2006.01)
  *B23D 59/02*   (2006.01)
  *B23D 61/02*   (2006.01)
  *B24B 55/02*   (2006.01)

(52) U.S. Cl.
  CPC .......... *B23D 45/046* (2013.01); *B23D 47/08* (2013.01); *B23D 59/02* (2013.01); *B23D 61/02* (2013.01); *B24B 55/02* (2013.01); *B27B 5/10* (2013.01); *B28D 1/045* (2013.01); *B28D 7/02* (2013.01); *E01C 23/09* (2013.01); *E01C 23/0933* (2013.01); *B23D 45/02* (2013.01); *B23D 45/04* (2013.01)

(58) Field of Classification Search
  CPC ...... B23D 45/046; B23D 47/08; B23D 59/02; B23D 61/02; B23D 45/02; B23D 45/04; B24B 55/02; B27B 5/10
  See application file for complete search history.

(56) References Cited

U.S. PATENT DOCUMENTS

| | | | |
|---|---|---|---|
| 4,998,775 A * | 3/1991 | Hollifield | B23D 59/002 125/14 |
| 5,477,844 A | 12/1995 | Meister | |
| 5,492,431 A | 2/1996 | Rasmussen et al. | |
| 5,724,956 A * | 3/1998 | Ketterhagen | B28D 1/045 125/12 |
| 7,114,494 B2 * | 10/2006 | Baratta | B28D 1/045 125/12 |
| 8,056,549 B1 | 11/2011 | Fleetwood | |
| 2010/0109421 A1 | 5/2010 | Kraemer | |
| 2011/0146648 A1 * | 6/2011 | Irvine | B28D 7/02 125/13.01 |
| 2012/0174905 A1 * | 7/2012 | Lee | B23D 47/02 125/12 |

OTHER PUBLICATIONS

Supplementary European Search Report in corresponding European application No. 15 83 9963 dated Jul. 21, 2017, 9 pages.
Written Opinion of the International Preliminary Examining Authority in PCT/AU2015/000550 dated Feb. 17, 2016, 8 pages.
Written Opinion of the International Searching Authority in PCT/AU2015/000550 dated Dec. 2, 2015, 8 pages.
International Search Report in PCT/AU2015/000550 dated Sep. 23, 2015, 7 pages.
Written Opinion of the International Searching Authority in PCT/AU2015/000550 dated Sep. 23, 2015, 8 pages.
Examination Report dated Aug. 23, 2018 in corresponding European application No. 15 839 963.4, 6 pages.

* cited by examiner

WET CUTTING SAW

CROSS REFERENCE TO RELATED APPLICATIONS

The present application is a U.S. National Stage of International Application No. PCT/AU2015/000550 filed on Sep. 8, 2015, which claims the benefit of Australian Patent Application Nos. 2014903619 filed Sep. 10, 2014, and 2015902583 filed Jul. 1, 2015, the entire disclosures of all of which are incorporated herein by reference.

TECHNICAL FIELD

The present disclosure relates to wet cutting saws.

BACKGROUND

Wet cutting saws are typically used to cut through hard materials such as concrete, bitumen, rock, bricks and tiles. Water (or another suitable liquid) is fed onto the circular blade of the wet cutting saw primarily to act as a coolant for the blade as the heat created by the friction of the blade as it rotates to cut the hard materials is quite substantial. The water is also added to clean the teeth of the saw blade (should it have teeth) and to flush cuttings out of the cut formed by the blade. Typically, the water used with the wet cutting saw forms a slurry with particles of the hard material which are formed during the cutting process.

In many applications of wet cutting saws, it is necessary to provide adequate control of the flow of the water and slurry away from the wet cutting saw. Such applications may include when cutting inside buildings such as shopping centres and in circumstances where it is necessary to protect the environment from such flows. Conventionally, this has been achieved by vacuuming up the slurry and water run-off which flows away from the blade. For small wet cutting saws, this may be readily achieved by a single person operating a hand held vacuum.

Recent developments in wet cutting saws have seen a significant increase in the power of the saws. These more powerful cutting saws more readily cut through concrete, rock and other such hard materials thus enabling faster use of the saws. One consequence, however, of these more powerful saws is that more water is required to cool the blade, which in turn means that controlling the flow of water and slurry away from the blade is more difficult. As a result, either the speed of use of the wet cutting saw is limited, despite its greater power, or operators of the cutting saws have to employ more than one manually operated vacuum or even industrial vacuum pumps to control the water and slurry flow away from the blade (at considerable additional cost to the operator).

In Australian patent no. 2008902732, the Applicant described a wet cutting saw in which a collector was provided on the side wall of the hood of the saw to collect liquid leaving the blade as the blade rotates and recycle the liquid to the blade. Although this provided a significant advance on prior wet cutting saws by limiting the flow of liquid away from the saw, it remains desirable to develop improved wet cutting saws.

SUMMARY OF THE DISCLOSURE

The present disclosure relates to improved wet cutting saws.

In one embodiment, the present disclosure provides a wet cutting saw for cutting a ground portion, the wet cutting saw comprising:
a blade rotatable about an axis;
a liquid feed conduit for feeding liquid onto a surface of the blade as it rotates;
a frame for carrying the blade and configured to travel over a surface of the ground portion; and
a mounting assembly that mounts the blade to the frame, at least part of the mounting assembly pivotable relative to the frame to raise and lower the blade relative to the frame.

In another embodiment, the present disclosure provides a wet cutting saw for cutting a ground portion, the wet cutting saw comprising:
a blade rotatable about an axis;
a liquid feed conduit for feeding liquid onto a surface of the blade as it rotates;
at least one liquid collector for collecting some of the liquid which leaves the blade surface as it rotates; and
a vacuum conduit having an inlet located to enable the vacuum conduit to collect additional liquid that has left the blade surface from a surface of the ground portion.

BRIEF DESCRIPTION OF THE DRAWINGS

Embodiments of the present disclosure will now be described, by way of example only, with reference to the accompanying drawings, in which.

DETAILED DESCRIPTION OF EMBODIMENTS

Figure 1:
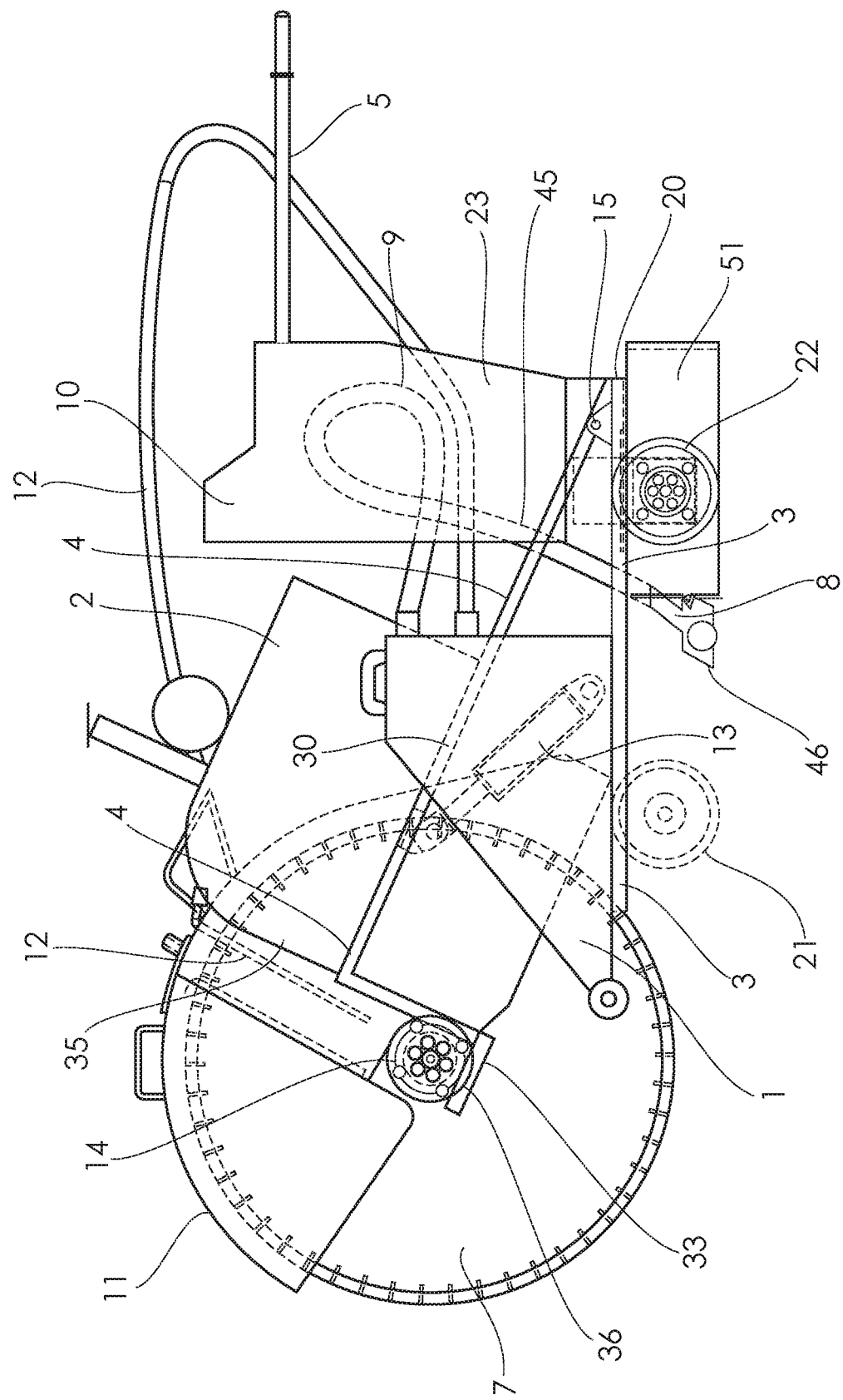
FIG. 1 is a side schematic view of a wet cutting saw according to an embodiment of the present disclosure.

The present disclosure relates to wet cutting saws for use in cutting ground portions such as slabs of concrete, bitumen roads, rock, tiled or bricked surfaces.

Disclosed in some embodiments is a wet cutting saw for cutting a ground portion, the wet cutting saw comprising:
a blade rotatable about an axis;
a liquid feed conduit for feeding liquid onto a surface of the blade as it rotates;
at least one liquid collector for collecting some of the liquid which leaves the blade surface as it rotates; and
a vacuum conduit having an inlet located to enable the vacuum conduit to collect additional liquid that has left the blade surface from a surface of the ground portion.

The present inventors found that by providing liquid collectors, most of the liquid that is thrown from the blade as it rotates can be collected and potentially recycled to the blade. This is particularly the case when the applicant's liquid collector for a wet cutting saw that is mounted on the side wall of the cutting saw, as described in Australian patent no. 2009253732 is used. When the collected liquid is recycled, substantially less liquid is required when using the wet cutting saw. However, the inventor has found that not all of the liquid is collected by such collectors. Although, the amount of liquid (and slurry) that is not collected but instead runs out from under the saw and over the ground, is substantially reduced when compared to prior wet cutting saws. The inventor has found that by providing the vacuum conduit, at least some, and preferably most of the liquid that is not collected by the liquid collectors and ends up on the ground can be collected. Because the liquid collectors are still collecting a large proportion of the liquid thrown from the blade, the size of the vacuum conduit inlet and the vacuum power required to collect most of the liquid off the ground is significantly reduced as compared to a system in which all the liquid was collected using a vacuum arrangement.

The liquid collected from the liquid collectors and/or the vacuum conduit may be sent to a storage tank on the wet cutting saw. Liquid can then be drawn from this storage tank via the liquid feed conduit to provide liquid to the blade of the wet cutting saw. Any solids in the liquid may be filtered out as the liquid flows into or out of the tank or within the tank itself by filtration or settling for example. Because the combination of the liquid collectors and the vacuum conduit collect most of the liquid that is fed to the blade, with a sufficient starting volume of liquid in the tank, the wet cutting saw may be operated without needing to remain connected to a bulk water source. Conventional wet cutting saws are often connected to mains water or a large tank on the back of a truck by a hose—which can make such saws awkward to operate.

When a wet cutting saw that is operator driven is required to be turned, for example to change the direction of the cut, the blade has to be lifted out of the ground. For conventional wet cutting saws this involves tilting the wet cutting saw. For some conventional saws, the tilting relies on moving the front wheels back towards the rear wheels and away from the frame or body of the saw whilst using the rear wheels as a fulcrum to raise the blade into the air. The wet cutting saw is then turned—typically by lifting the rear wheels off the ground and turning on the front wheels—in this tilted configuration until the desired orientation is achieved. The wet cutting saw can then be lowered to lower the blade back to the ground.

If tilting and turning the wet cutting saw in the above described way with a tank of liquid on the saw, liquid will slosh around. This creates mass imbalances when trying to manoeuvre the saw. Also, the liquid may be caused to spill out of the tank. In addition, the added weight of a tank of liquid will make this process more difficult.

Disclosed in some embodiments is a wet cutting saw for cutting a ground portion, the wet cutting saw comprising:

a blade rotatable about an axis;

a liquid feed conduit for feeding liquid onto a surface of the blade as it rotates;

a frame for carrying the blade and configured to travel over a surface of the ground portion; and a mounting assembly that mounts the blade to the frame, at least part of the mounting assembly pivotable relative to the frame to raise and lower the blade relative to the frame.

By having a mounting assembly for the blade in which a part thereof pivots with respect to the frame to raise and lower the blade relative to the frame, the above identified problem with respect to a liquid storage tank is avoided. In such embodiments where the wet cutting saw has a liquid storage tank, the tank can be mounted to the frame and thus the wet cutting saw is raised and lowered independently of the liquid storage tank.

An additional advantage of the above described embodiment is that it makes raising and lowering the blade in order to manoeuvre the user operated wet cutting saw a significantly less arduous task when compared to using conventional wet cutting saws. As already mentioned, to manoeuvre the wet cutting saw to change the direction of the cut, the rear wheels of the wet cutting saw are lifted off the ground by an operator and the saw is turned on its front wheels. The inventor has found that for many conventional wet cutting saws, the load on the user to lift the wet cutting saw is about 70-80 kgs. This is because the weight of conventional saws is carried over the rear wheels when the blade is lifted out of the ground. The operator has to manoeuvre the wet cutting saw under this load (usually whilst the saw remains on) into the desired orientation. Furthermore, because the conventional wet cutting saw is first tilted over its rear wheels to lift the blade out of the cut, the initial position of the handles which the operator uses to lift the saw are usually only 30-40 cms off the ground. Because of this process, operators of wet cutting saws often sustain back injuries.

In the above described embodiment of the present disclosure, by enabling the blade of the wet cutting saw to be raised and lowered independently with respect to the frame and independently with respect to the frame's movement by pivoting part of the mounting arrangement, operators can manoeuvre the frame with the blade in a raised position comfortably, for example using handles positioned at an appropriate height. Furthermore, this embodiment of the present disclosure provides a wet cutting saw which can have its weight distributed across the frame so that when an operator is lifting the saw to manoeuvre it, the load of the saw on the operator is only 30-40 kgs.

In an embodiment, the wet cutting saw is configured so that the centre of gravity of the saw does not substantially change in a horizontal direction relative to the frame when raising or lowering the blade.

In an embodiment, the mounting assembly comprises an arm that is connected at one end to the blade and at the opposite end to the frame and is pivotable about its connection to the frame.

In an embodiment, the arm is configured so that the pivot connection between the arm and the frame is vertically above the centre of gravity of the arm.

The arm's centre of gravity is determined by the arm and any components of the wet cutting saw mounted to the arm.

Advantageously, by having the arm configured in this manner, the centre of gravity of the arm tends to move up and down relative to the frame as the arm pivots and does not move substantially horizontally. This assists to minimise the load of the saw on an operator when they are lifting the saw to manoeuvre it.

In an embodiment, the arm is pivotable between a lowered position and a raised position.

In an embodiment, the arm is configured so that the pivot connection between the arm and the frame is vertically above the centre of gravity of the arm when the arm is in its lowered position.

In an embodiment, the blade is mounted to a hub that defines the blade axis, the hub extending from a motor that is mounted to the arm of the mounting assembly.

A hydraulic ram may be provided to pivot the arm with respect to the frame. The ram may be operable using a control panel provided elsewhere on the wet cutting saw.

In an embodiment, the wet cutting saw comprises a drive system for driving rotation of the blade, the drive system mounted to the mounting assembly.

Advantageously, by mounting the drive system on the mounting assembly, the weight of the drive system can be used in lowering the blade with respect to the frame by providing a downward bias on the mounting assembly.

In an embodiment, the wet cutting saw also comprises a liquid storage tank for storing liquid to be fed through the liquid feed conduit onto the surface of the blade, the liquid storage tank mounted on the frame.

By having the liquid storage tank mounted to the frame, the blade is raised and lowered with respect to the liquid storage tank. In other words, when raising and lowering the blade, the liquid storage tank does not also have to be raised and lowered but instead remains anchored to the frame and level with respect to the ground. This alleviates the sloshing and handling problems mentioned above.

In an embodiment, the liquid storage tank is disposed towards the forward end of the frame.

Advantageously, the liquid storage tank provides a counter-weight to the blade when the blade is raised and lowered with respect to the frame; thus increasing the stability of the wet cutting saw.

In an embodiment, the wet cutting saw also comprises a steering mechanism for steering the saw over the surface being cut, the steering mechanism connected to the frame.

In an embodiment, the steering mechanism comprises one or more handles extending from the rear of the frame.

Advantageously, because the blade of the wet cutting saw is raised and lowered with respect to the frame, the steering mechanism (ie. the handles) being mounted to the frame remain in a fixed orientation with respect to the ground when the blade is raised or lowered. Thus, to reorientate the wet cutting saw in order to change the direction of cutting, the operator can comfortably manoeuvre the wet cutting saw using the steering mechanism at its normal operating height. This alleviates back strain for the operator.

In an embodiment, the wet cutting saw also comprises at least one liquid collector for collecting some of the liquid which leaves the blade surface as it rotates.

In an embodiment, the wet cutting saw also comprises a hood comprising a side wall located to one side of the blade and each liquid collector is located at the side wall of the hood.

In an embodiment, the wet cutting saw also comprises a vacuum conduit having an inlet located to enable the vacuum conduit to collect liquid from the surface of the ground portion being cut.

In an embodiment, the vacuum conduit inlet is located behind the blade.

In an embodiment, the vacuum conduit is fluidly connected to the liquid storage tank to enable the vacuum conduit to deliver collected liquid to the liquid storage tank.

In an embodiment, wherein the frame comprises a base and the wet cutting saw has front and rear ground engaging wheel sets connected to the base.

It is to be appreciated that the wheels do not form part of the frame but that the blade is raised and lowered with respect to the wheels when the blade is raised and lowered with respect to the frame by pivoting at least part of the mounting assembly.

In an embodiment, the front and rear wheel sets remain in a substantially fixed spaced apart relationship relative to each other when pivoting the or part of the mounting assembly to raise and lower the blade relative to the frame.

In an embodiment, the wet cutting saw comprises one or more skirts extending from the base around at least one of the wheels.

Referring now to the Figures, there is shown a wet cutting saw 10 according to an embodiment of the present disclosure. The wet cutting 10 saw comprises a circular blade 7 that rotates about an axis, a frame 3 for carrying the blade and a mounting assembly 4 that mounts the blade to the frame and is configured to raise and lower the blade relative to the frame by pivoting at least part of the mounting assembly with respect to the frame.

The frame 3 comprises a base 20 which may be in the form of framework or a base plate. The wet cutting saw 10 has front and rear pairs of ground engaging wheels 21, 22 attached to the base 20. The front and rear pairs of wheels 21, 22 are connected to the base such that they remain in a substantially fixed spaced apart relation to one another at all times during operation of the wet cutting saw 10. This includes when the blade is raised and lowered with respect to the frame by pivoting at least part of the mounting assembly. An upper section 23 of the frame extends from the base 20 at the rear of the frame. The upper section 23 provides a shield for the operator standing behind the wet cutting saw from being sprayed with liquid and slurry. A steering mechanism in the form of elongate handles 5 extend rearwardly from the upper section 23 of the frame. The handles 5 are used by the operator to orientate and direct movement of the wet cutting saw 10. In other embodiments, the steering mechanism is in the form of a steering wheel that is connected to one or both of the pairs of wheels attached to the base.

The mounting assembly 4 comprises an arm 30 in the form of framework or a plate. At one end the arm 30 is connected to the base 20 of the frame in a manner which enables the arm to pivot relative to the frame about this connection. The connection between the arm and the base of the frame is provided by a pivot bar 31 which defines the pivot axis. The pivot bar 31 extends between lugs 15 provided on the base 20 of the frame 3, through a cavity in the arm 30.

At the opposed end of the arm 30, the arm is connected to the blade 7. The blade 7 is positioned to one side of the wet cutting saw 10. Specifically, in the embodiment shown, the blade 7 is positioned on the right hand side of the frame 3. Advantageously, as will be described in further detail below, the wet cutting saw is configured so that the blade could be repositioned on the left hand side of the frame. The end of the arm 30 to which the blade 7 is connected has a seat portion 33 to which the blade is attached. When the arm 30 is in its lowered positioned and resting on the base 20 of the frame 3, the seat portion 33 hangs below the base 20, at the front end of the wet cutting saw 10. By mounting the blade 7 to the seat portion 33, the blade is able to cut to its maximum depth. At the same time the depth to which the blade can cut is limited by the seat portion 33. Thus, the centre of the blade (as defined by the blade axle or shaft) cannot be lowered below the ground surface in use. This distinguishes the wet cutting saw 10 of the present disclosure from some other types of saws such as plunge saws.

The wet cutting saw 10 also comprises a drive system 35 for driving rotation of the blade 7. The drive system 35 comprises a primary motor 2, which in one embodiment is a diesel motor. The primary motor 2 directly or indirectly drives rotation of the blade. In the embodiment illustrated in the Figures, the primary motor indirectly drives rotation of the blade through a second motor 14 of the drive system 35, which in a preferred form is a hydraulic motor. The drive system and in particular the primary motor 2 and the second motor 14 are mounted on the arm 30 of the mounting assembly 4. Thus, the weight of these components of the drive system provides a downward bias on the arm 30 and thereby assists in lowering the blade with respect to the frame.

The second motor 14 is mounted on the seat portion 33 of the arm 30 and has hubs 36 extending from either side. The blade 7 can be mounted to either hub 36 of the second motor 14. This enables the blade to be switched between being mounted on the left hand side or on the right hand side of the wet cutting saw.

The mounting assembly 4 also comprises a lifting device for raising and lowering the arm 30 with respect to the frame 3 in the form of hydraulic piston or ram 13. The ram 13 is pivotally connected to the base 20 of the frame 3 at one end and is pivotally connected to arm 30 at its opposed end. The ram 13 is thus configured to rotate as it extends to raise the arm 30 with respect to the frame 3. The hydraulic ram 3 may be powered using a hydraulic pump that forms part of the drive system 35 of the wet cutting saw and which is primed by the primary motor 2. Operation of the hydraulic ram 3 may be controlled remotely by for example a control panel provided on the upper section of 23 of the frame. In this way, the raising and lowering of the blade can be conveniently and safely carried out by the operator, such as by pressing a button, to signal the hydraulic ram to operate as required.

The wet cutting saw 10 also comprises a liquid feed conduit 12 for feeding liquid (typically water or other suitable liquid) onto a surface of the blade 7 as it rotates. A blade guard or hood 11 comprising a top wall 40 and side walls 41, 42 extending from the top wall is provided over the blade 7. One or more liquid collectors 50 as described in the applicant's Australian patent no. 2009253732 are mounted on one or both of the side walls 41, 42 of the hood 11 to collect liquid and slurry as it is thrown from the blade in use.

In an alternative embodiment to having the liquid collectors 50, the amount of liquid being thrown from the blade may be reduced by reducing the amount of liquid fed to the blade.

A wet cutting saw 10 also comprises a liquid storage tank 1. The tank 1 is mounted on the base 20 of the frame 3. The tank 1 is located in the forward section of the wet cutting saw 10 so that it is mounted to the base of the frame over the forward wheels 21. This is to provide stability to the wet cutting saw when the blade 7 is raised by the mounting assembly 4 as the weight of the blade 7 and drive system 2 that are mounted to the mounting assembly is transferred through the arm 30 to its connection to the base 20 towards the rear of the wet cutting saw.

Mounting the liquid storage tank 1 to the frame 3 and having the blade 7 being raised and lowered with respect to the frame by a separate mounting assembly 4 means that when the blade is raised or lowered the tank 1 does not have to move with the blade. This avoids difficulties that might arise if the tank 1 had to be raised and tilted when raising the blade 7.

The liquid and slurry that is collected by the liquid collectors mounted on the hood 11 is directed to the tank 1 either to store the slurry for later disposal or to reuse the liquid by the wet cutting saw. Where the liquid is recycled from the tank 1 to the blade 7, a separator, such as a filter, may be provided to separate the liquid from any solids produced by the cutting process and entrained in the liquid to form a slurry. Alternatively, the liquid taken from the tank 1 to be recycled to the blade 7 is drawn from near the top of the tank 1. The liquid near the top of the tank will have a lower solids content as the solids are allowed to settle to the bottom of the tank.

Although the liquid collectors on the hood 11 collect a large proportion of the liquid and slurry that is thrown from the blade 7 during use of the wet cutting saw, the inventor has found that not all of the liquid is collected by these collectors. Some liquid and slurry escapes from the hood 11 and runs out over the ground being cut. The wet cutting saw 10 is provided with a vacuum conduit in the form of a vacuum tube or wand 45 having a head portion 46 that defines an inlet 8. A vacuum pump (which may or may not be drive by the primary motor 2 of the drive system 35) is configured to apply a negative pressure to the vacuum wand 45.

The head portion 46 of the vacuum wand is configured so that it and hence the inlet 8 is close to the ground over which the wet cutting saw 10 is travelling. In the illustrated embodiment, the head portion 46 has an idler wheel or roller 47 that runs over the ground and spaces the head portion by 0.5-3 cm from the ground. Because of the negative pressure applied to the vacuum wand 45, liquid that has escaped the hood 11 is drawn into the vacuum wand 45 through the head portion inlet 8. The vacuum wand 45 is fluidly connected to the liquid storage tank 1 so that liquid and slurry collected by the vacuum wand 45 is sent to the liquid storage tank 1. The tank 1 itself may be under negative pressure to draw in the liquid through the vacuum wand 45 as well as to draw in liquid from the liquid collectors in the hood 11.

The head portion 46 and the vacuum inlet 8 are rectangular and are configured so that their longitudinal extent is disposed transverse to the orientation of the blade 7 and hence the direction in which the wet cutting saw 10 travels and the cut is formed. The head portion 46 and the vacuum inlet 8 are located behind the blade 7 in the direction of travel of the wet cutting saw in use; in a mid-region between the forward and rear wheels 21, 22. The inventor has found that this is where a substantial amount if not all of the liquid escaping the hood 11 flows.

The liquid feed conduit 12 that supplies liquid to the blade surface as it rotates can be connected to separate liquid source; such as to mains water or to an external tank. However, with both the liquid collectors on the hood and the vacuum wand 45 collecting and returning liquid to the liquid storage tank 1, the liquid feed conduit 12 may alternatively be connected to and supply liquid from the liquid storage tank 1.

The wet cutting saw 10 also comprises a skirt 51 extending from and around the periphery of the base 20 of the frame 3. A portion of the skirt is illustrated in FIG. 1. The skirt 51 extends to ground level. The skirt is located outside of the wheels 21, 22 so that the skirt mitigates liquid and slurry from fouling the wheels 21, 22 and affecting their bearings.

Figure 3:
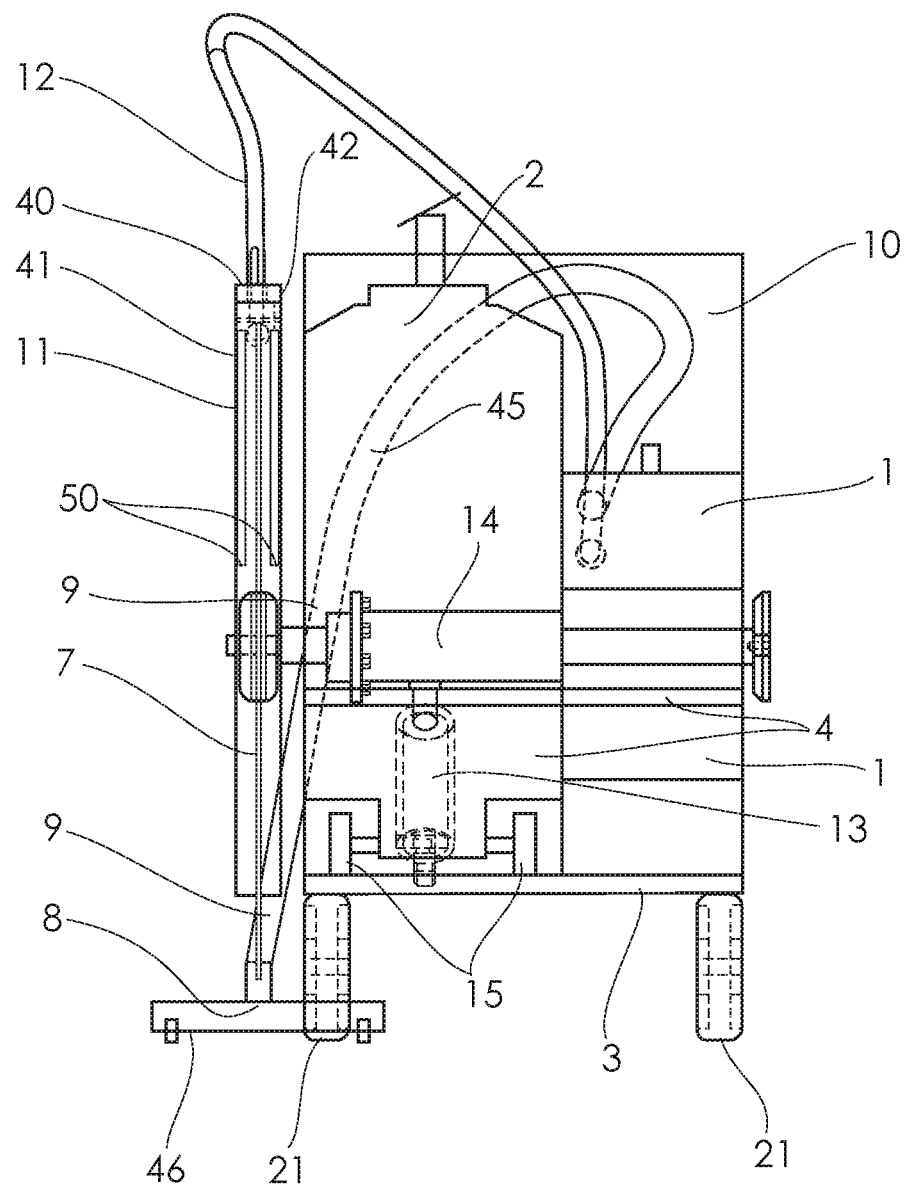
FIG. 3 is a front schematic view of a wet cutting saw according to the embodiment shown in FIGS. 1 and 2.
Figure 4:
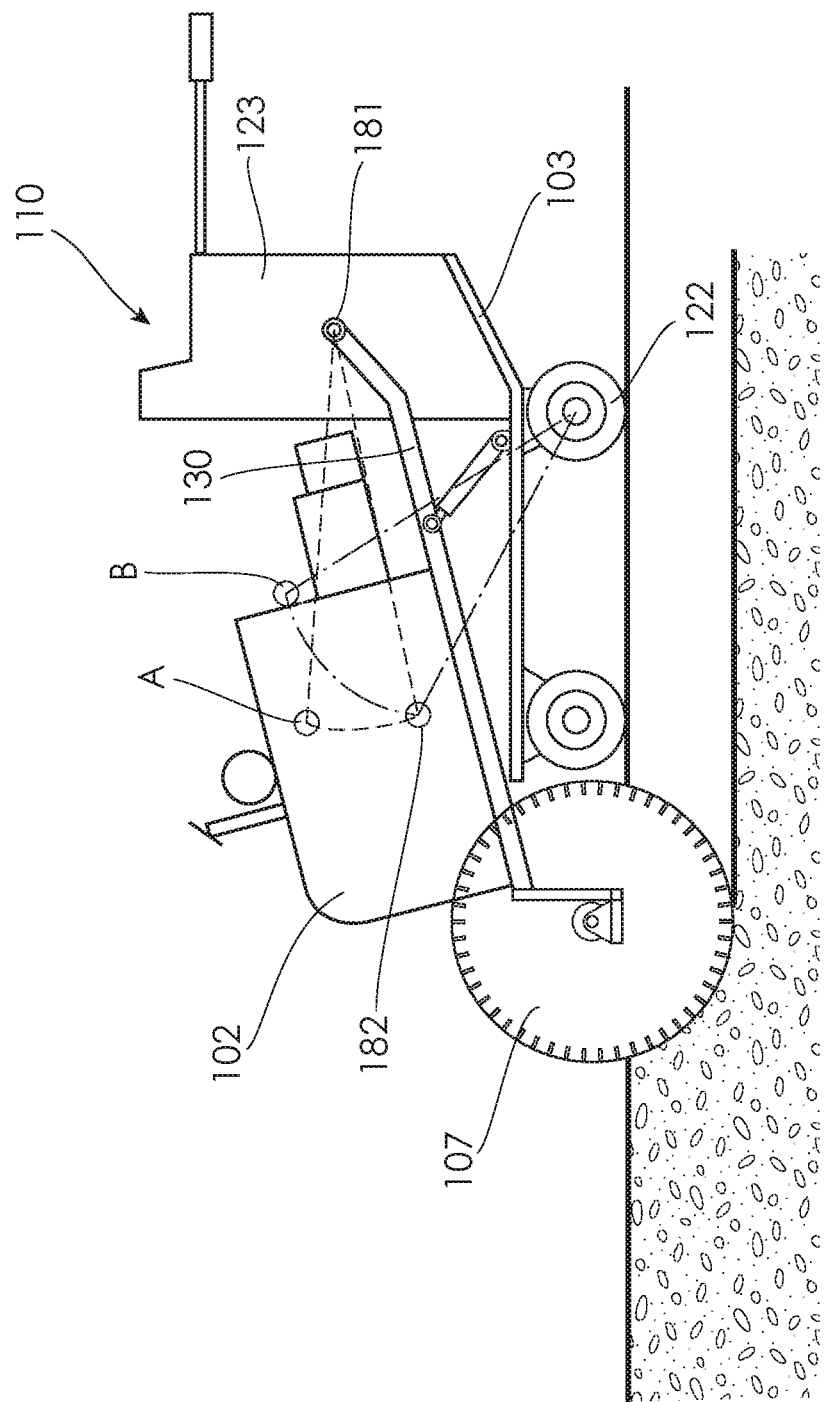
FIG. 4 is a side schematic view of a wet cutting saw according to another embodiment of the present disclosure with the saw blade in a lowered, operative, position.
Figure 5:
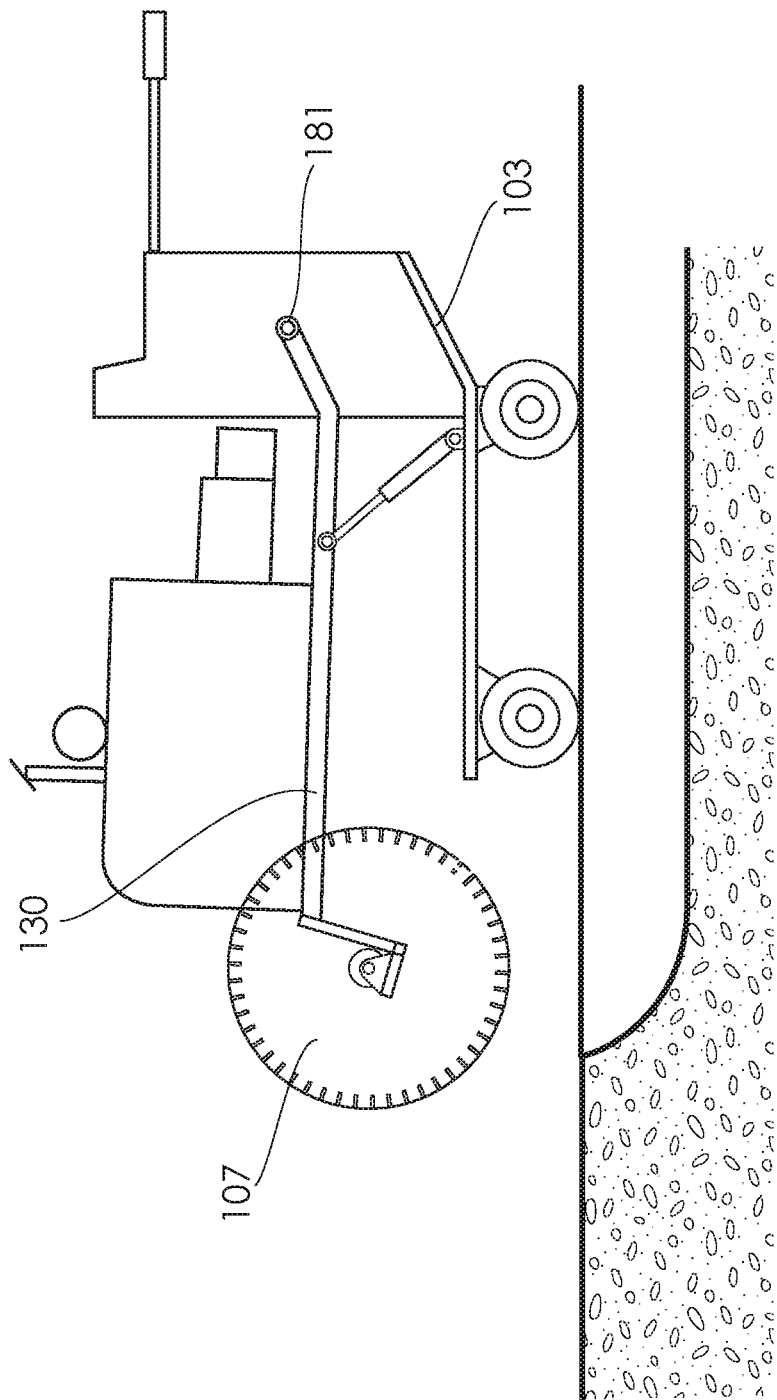
FIG. 5 is a side schematic view of the wet cutting saw of FIG. 4 with the blade in a raised position.

Referring to FIGS. 4 and 5, a wet cutting saw 110 according to another embodiment of the present disclosure is shown. The wet cutting saw 110 is similar to the saw 10 illustrated in FIGS. 1-3. Similar features of the saw 110 have been given the same reference numbers but prefixed with the numeral 1.

Figure 2:
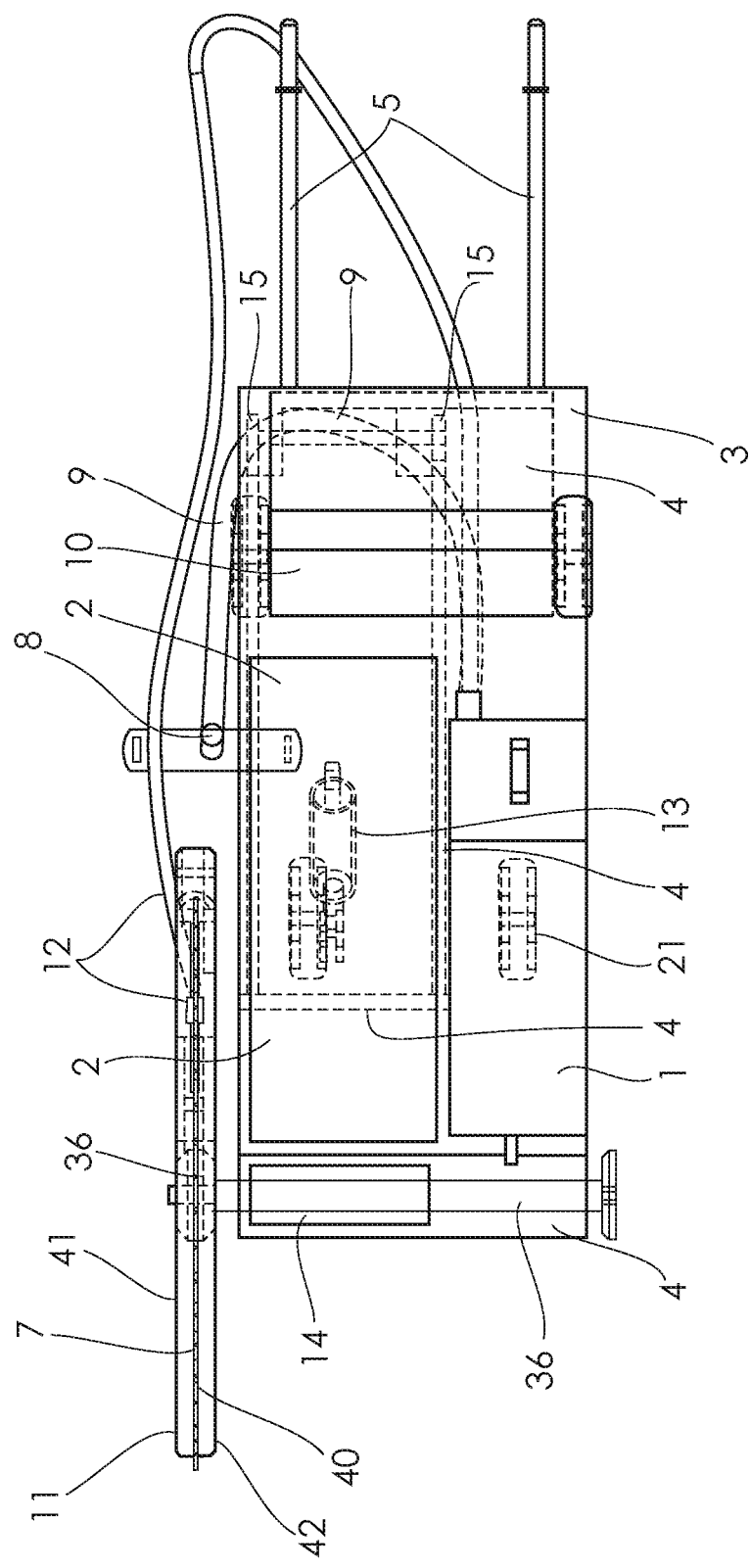
FIG. 2 is a top schematic view of a wet cutting saw according to the embodiment shown in FIG. 1.

In the wet cutting saw 110 of FIGS. 4 and 5, the end of the arm 130 that is connected to the frame 103 of the saw is connected at a higher location on the frame as compared to the saw 10 of FIGS. 1-3. The connection between the end of the arm 130 and the frame 103 is via a pivot connection 181 that is located on the upper section 123 of the frame (rather than the base 120). In this configuration the pivot connection 181 between the arm 130 and the frame 103 is vertically above the centre of gravity 182 of the arm 130 for at least when the arm is in a lowered position (FIG. 4). The centre of gravity of the arm 182 is defined by the weight of the arm as well as the weight of components carried by the arm such as the blade 107 and the primary motor 102.

By configuring the connection between the arm and the frame in this manner, when the arm is raised, the centre of gravity of the arm moves generally only in a vertical direction with respect to the frame, ie. to the position indicated by A. The centre of gravity does not substantially change horizontally with respect to the frame. As a result the load of the saw on an operator when maneuvering the saw with the blade in a raised position is reduced. This can be compared in FIG. 4 to conventional wet cutting saws which are pivoted on their rear wheels 122 to raise and lower the blade; in which case the centre of gravity of the saw moves rearwardly to the position indicated by B. As a result, in conventional wet cutting saws, additional loading is placed on the operator when the blade is raised from the ground.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A wet cutting saw for cutting a ground portion, the wet cutting saw comprising:
   a blade rotatable about an axis;
   a liquid feed conduit for feeding liquid onto a surface of the blade as the blade rotates;
   a frame for carrying the blade, the frame having a base and an upper section extending from the base;
   a mounting assembly that mounts the blade to the frame, the mounting assembly comprising an arm and connected to, and pivotable relative to, the frame about a pivot connection between the arm of the mounting assembly and the frame to raise and lower the blade relative to the frame between a lowered position and a raised position, the pivot connection being located on the upper section of the frame, and wherein the arm comprises an upper portion and a lower portion connected to the upper portion at an elbow at an angle, the pivot connection is located at a proximal end of the upper portion, a distal end of the upper portion is connected to a proximal end of the lower portion at the elbow, and a distal end of the lower portion is connected to the blade; and
   a drive system comprising a primary motor coupled to the blade, the drive system mounted to the mounting assembly;
   wherein the drive system, including the primary motor, is mounted to the arm of the mounting assembly so that a weight of the drive system provides a downward bias on the arm for lowering the blade with respect to the frame and so that the drive system is raised and lowered with the arm relative to the frame;
   wherein the pivot connection is above a centre of gravity of the arm when the arm is in the lowered position, the centre of gravity of the arm being determined by the arm, and components mounted to the arm comprising the blade, and the primary motor;
   wherein the pivot connection is below the centre of gravity of the arm when the arm is in the raised position;
   a set of steering handles connected to the frame and extending outward from a rear of the frame;
   a front pair of ground engaging wheels connected to the base;
   a rear pair of ground engaging wheels connected to the base;
   wherein the centre of gravity of the arm is substantially different vertically, between the lowered position and the raised position, with respect to the frame;
   wherein the elbow is configured such that the centre of gravity of the arm is substantially identical horizontally, between the lowered position and the raised position, with respect to the frame; and
   whereby a force applied to raise the handles raises the rear pair of ground engaging wheels enabling turning the wet cutting saw on only the front pair of ground engaging wheels.

2. The wet cutting saw as claimed in claim 1, where the arm is connected at one end to the blade and at the opposite end to the frame.

3. The wet cutting saw as claimed in claim 1, further comprising a liquid storage tank for storing liquid to be fed through the liquid feed conduit onto the surface of the blade, the liquid storage tank mounted on the frame.

4. The wet cutting saw as claimed in claim 3, wherein the liquid storage tank is disposed towards the forward end of the frame.

5. The wet cutting saw as claimed in claim 1, further comprising at least one liquid collector for collecting some of the liquid which leaves the blade surface as the blade rotates.

6. The wet cutting saw as claimed in claim 5, further comprising a hood that comprises a side wall located to one side of the blade, wherein the at least one liquid collector is located at the side wall of the hood.

7. The wet cutting saw as claimed in claim 1, further comprising a vacuum conduit having an inlet located to enable the vacuum conduit to collect liquid from the surface of the ground portion being cut, and wherein the vacuum conduit inlet is located behind the blade.

8. The wet cutting saw as claimed in claim 1, further comprising:
   a liquid storage tank for storing liquid to be fed through the liquid feed conduit onto the surface of the blade, the liquid storage tank mounted on the frame; and
   a vacuum conduit having an inlet located to enable the vacuum conduit to collect liquid from the surface of the ground portion being cut,
   wherein the vacuum conduit is fluidly connected to the liquid storage tank to enable the vacuum conduit to deliver collected liquid to the liquid storage tank.

9. The wet cutting saw as claimed in claim 1, wherein the frame comprises a base and the wet cutting saw has front and rear ground engaging wheel sets connected to the base.

10. The wet cutting saw as claimed in claim 9, wherein the front and rear wheel sets remain in a substantially fixed space apart relationship relative to each other when pivoting the or part of the mounting assembly to raise and lower the blade relative to the frame.

11. The wet cutting saw as claimed in claim 9, further comprising one or more skirts extending from the base around at least one of the wheels.

12. The wet cutting saw as claimed in claim 1, further comprising:
   at least one liquid collector for collecting some of the liquid which leaves the blade surface as the blade rotates; and a vacuum conduit having an inlet located to enable the vacuum conduit to collect additional liquid that has left the blade surface from a surface of the ground portion.

13. The wet cutting saw as claimed in claim 12, further comprising a hood that comprises a side wall located to one side of the blade, wherein the at least one liquid collector is located at the side wall of the hood.

14. The wet cutting saw as claimed in claim 12, further comprising a liquid storage tank mounted to the frame and in fluid connection with the vacuum conduit to enable the vacuum conduit to deliver collected liquid to the liquid storage tank.

15. The wet cutting saw as claimed in claim 1, wherein the primary motor indirectly drives rotation of the blade through a hydraulic motor.

16. The wet cutting saw as claimed in claim 1, further comprising a hydraulic ram coupled between the frame and the arm.

17. The wet cutting saw as claimed in claim 1, wherein the pivot connection is located between the set of steering handles and above an axis defined by the rear pair of ground engaging wheels.

\* \* \* \* \*